3,128,308
ALKYLENEBIS (BENZHYDRYLOXYALKYL) DIALKYL QUATERNARY AMMONIUM COMPOUNDS
Leonard Doub, Pontiac, and George Rieveschl, Jr., Grosse Pointe Farms, Mich., assignors to Parke, Davis & Company, Detroit, Mich., a corporation of Michigan
No Drawing. Filed Feb. 23, 1960, Ser. No. 10,111
12 Claims. (Cl. 260—567.6)

This invention relates to novel bis quaternary compounds and more particularly it relates to novel bis quaternary compounds which possess antimicrobial activity and to processes for the manufacture thereof.

The novel bis quaternary compounds with which the present invention is concerned are represented by the formula

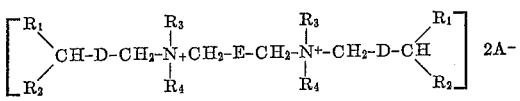

wherein $R_1$ represents a phenyl radical and $R_2$ represents a phenyl radical or a phenyl radical substituted by a halogen atom or a lower alkyl radical; $R_3$ and $R_4$ are lower alkyl radicals containing 1 or 2 carbon atoms or together represent an alkylene radical containing four to five carbon atoms; D represents an alkylene radical or an alkylene radical in which an —O— or —S— atom is substituted for at least one but not more than two-thirds of the non-adjacent methylene groups, said D group contains between one and eight atoms in its principal chain; E represents an alkylene radical or an alkylene radical in which some, but less than two-thirds of the non-adjacent methylene groups may be replaced by —O— or —S— atoms, said E group contains between four and thirty atoms inclusive in its principal chain; and $A^-$ is one equivalent of an anion of an inorganic or organic acid. The —O— or —S— atoms may appear anywhere within the principal chain of the D and E groups.

As stated above, the novel substances are useful as antimicrobial agents. They have demonstrated outstanding activity when tested in vitro against Streptococcus pyogenes. The compounds are suitable as sterilizing agents or for topical use. The compounds of the invention which have the formula

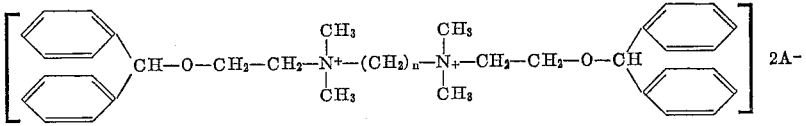

where $A^-$ represents one equivalent of an anion of an acid, preferably of a hydrohalic acid, and $n$ is an integer between 6 and 14 inclusive; are preferred.

The nature of the anion $A^-$ is not critical, but obviously when the salts are used therapeutically, anions which are pharmacologically undesirable are to be avoided. Examples of suitable anions are those furnished by hydrochloric, hydrobromic, hydroiodic, sulfuric, sulfamic, phosphoric, nitric, p-toluenesulfonic, methylsulfuric, ethylsulfuric, propylsulfuric, acetic, propionic, stearic, palmitic, oleic, citric, oxalic, succinic, tartaric, benzoic, phthalic, salicylic acids and the like.

In accordance with the invention, the compounds of the present invention may be prepared by reacting a compound of the type $$Ac—CH_2—E—CH_2—Ac$$

with a tertiary amine having the formula

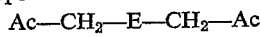
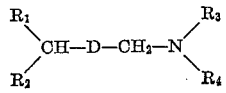

wherein AC represents an acid residue of a reactive ester such as e.g. a halogen atom, the tosylate or sulfate radical; E, $R_1$, $R_2$, D, $R_3$ and $R_4$ have the same meaning stated above. The reaction is preferably carried out in a solvent medium. Suitable solvents for the reaction are acetonitrile, ether, toluene, acetone, ethyl acetate, nitromethane and the like. The preferred solvent medium is acetonitrile. The time and temperature of the reaction are not critical. Heating may be used to facilitate the reaction, although the quaternization usually takes place readily at room temperature. The quaternary ammonium salt separates directly from the reaction mixture or can be obtained by concentration of the solution. In many instances, the product separates from the reaction mixture in crystalline form and requires little or no further purification. Where the number of atoms in the principal chain of E is comparatively large or complex, the compounds may separate as amorphous or glassy solids.

Alternatively, the compounds of the invention may be prepared by reacting a compound of the type

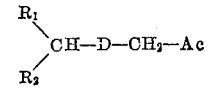

with a diamine of the type

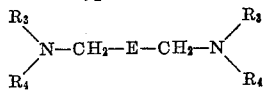

wherein $R_1$, $R_2$, D, E, Ac, $R_3$ and $R_4$ have the same meaning stated hereinbefore. The reaction is advantageously conducted in a solvent medium. Suitable solvents for the reaction are acetonitrile, ether, toluene, acetone, ethyl acetate, nitromethane and the like. The preferred solvent medium in acetonitrile. The time and temperature of the reaction are not critical. Heating may be used to facilitate the reaction, although the quaternization usually takes place readily at room temperature.

Additionally, compounds of the present invention may be prepared by reacting a diamine having in free base form the formula

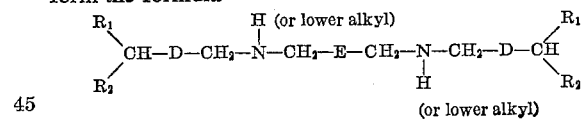

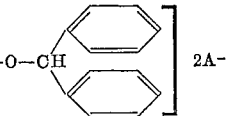

with a quaternizing agent. In the above formula, $R_1$, $R_2$, D and E have the same meaning as stated hereinbefore; the lower alkyl radical and the substituents provided by the quaternizing agent being such as will give the desired lower alkyl substituents in the compounds represented by the general Formula I. Suitable quaternizing agents are appropriate alkyl esters of inorganic acids or organic sulfonic acids. The alkyl esters so used may include such compounds as lower molecular weight alkyl halides such as methyl iodide, ethyl bromide, allyl chloride; dimethyl sulfate, diethyl sulfate; methyl benzenesulfonate, ethyl p-toluenesulfonate, and the like. The reaction is preferably carried out in a solvent medium. Suitable solvents for the reaction are lower molecular weight alcohols and ketones, acetonitrile, chloroform, benzene, toluene and the like. A preferred solvent medium is acetonitrile. The time and temperature of the reaction are not critical. The reaction may be conducted by allowing the diamine to stand at room temperature with the quaternizing agent in a suitable solvent such as acetonitrile or methanol, with the addition where necessary of an acid-binding agent such as e.g. sodium carbonate. Heating may be used to facilitate the reaction, although the quaternization usually proceeds readily at room temperature. In carrying out the reaction it is usually satisfactory to employ four moles of the quaternizing agent for each mole of the diamine, although preferably an excess of the quaternizing agent is employed.

The diamines of the above formula utilized as starting materials for this process are new and can be produced by reacting, in a solvent medium, an α,ω-dihalide of the formula Halogen-CH$_2$—E—CH$_2$-Halogen with a suitable amine of the formula

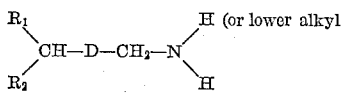

wherein R$_1$, R$_2$, D, lower alkyl and E have the same meaning as stated hereinbefore.

The bis quaternary compounds containing anions which are not directly obtainable by means of the aforesaid processes the bitartrate or phosphate can be formed from the salts so obtainable either by direct metathesis or by the action of the appropriae acid on the bis quaternary hydroxide.

The invention is illustrated but not limited by the following examples:

Example 1

24.4 g. of 1,6-dibromohexane and 55 g. of 2-(-benzhydryloxy-N,N-dimethylethylamine are dissolved in 50 ml. of acetonitrile and allowed to stand for 24 hours at 50° C. in a flask loosely stoppered with aluminum foil. After cooling the hexamethylenebis{[2-(benzhydryloxy)ethyl]dimethylammonium bromide} which separates is collected, washed with ether and dried; M.P. 220–21° C. (dec.). The product can be recrystallized from isopropanol and methanol.

The following compounds can also be prepared by reaction, in the manner described, of the 1,6-hexamethylene di-halide and the corresponding tertiary amine.

Hexamethylenebis{[3-(benzhydrylthio)-propyl]dimethylammonium bromide}.

Hexamethylenebis{[2 - (p-brombenzhydryloxy)ethyl]piperidinium bromide}.

Hexamethylenebis[2 - (benzhydryloxy)ethylpyrrolidinium iodide].

Hexamethylenebis{[3 - benzhydryloxy)propyl]-dimethylammonium bromide}.

Example 2

6.1 g. of 1,6-dibromohexane and 14 g. of 2-(benzhydryloxy)-N,N-dimethylpropylamine are dissolved in acetonitrile and allowed to stand in a loosely stoppered flask for 30 hours at 50° C. The hexamethylenebis{[2-(benzhydryloxy)propyl]-dimethylammonium bromide} which separates is collected by filtration, washed with ether and dried; M.P. 171–175° C. (dec.).

Example 3

7.6 g. of 1,6-dibromohexane and 16.8 g. of 2-(benzhydryloxy)ethylpiperidine are dissolved in 40 ml. of acetonitrile. The reaction mixture is allowed to stand at room temperature for 30 days in a stoppered flask. The hexamethylenebis[2 - (benzhydryloxy)ethylpiperidinium bromide] which separates is collected by filtration, washed with ether and dried; M.P. 224–226° C. (dec.). The product can be recrystallized from isopropanol.

Similarly, 16.8 g. of 2-(benzhydryloxy)-ethylpyrrolidine can be substituted for 16.8 g. of the 2-(benzhydryloxy)ethylpiperidine to yield hexamethylenebis[2-benzhydryloxy)ethylpyrrolidinium bromide].

Example 4

13 g. of 1,7-dibromoheptane and 25 g. of 2-(benzhydryloxy)-N,N-dimethylethylamine are dissolved in 50 ml. of acetonitrile and the flask loosely stoppered with aluminum foil. The reaction mixture is then allowed to stand for about 20 hours at 50° C. After cooling, the heptamethylenebis{[2 - (benzhydryloxy)ethyl]dimethylammonium bromide} which separates is collected by filtration, washed with ether and dried; M.P. 220–221° C. (dec.).

Example 5

14 g. of 1,8-dibromooctane and 25.5 g. of 2-(benzhydryloxy)-N,N-dimethylethylamine are dissolved in 50 ml. of acetonitrile and allowed to stand in a loosely stoppered flask for 12 days at 50° C. After cooling, the octamethylenebis{[2 - (benzhydryloxy)ethyl]dimethylammonium bromide} which separates is collected by filtration, washed with ether and dried; M.P. 153–155° C. (dec.). The product can be recrystallized from an isopropanol-acetone solution.

Example 6

8.6 g. of 1,9-dibromononane and 7.8 g. of 2-(benzhydryloxy)ethylpiperidine are dissolved in 50 ml. of acetonitrile. The reaction mixture is then allowed to stand at room temperature in a stoppered flask until a sample is soluble in water (ca. 20 days). The nonamethylenebis[2 - (benzhydryloxy)ethylpiperidinium bromide] which separates is collected by filtration, washed with ether and dried; M.P. 201–204° C. (dec.). The product can be recrystallized from isopropanol.

Example 7

200 g. of 1,10-dibromodecane and 384 g. of 2-(benzhydryloxy)-N,N-dimethylethylamine are refluxed in 700 ml. of acetonitrile until a sample of the reaction mixture is completely soluble in water (overnight). The hot solution is poured into a beaker and allowed to cool. Upon cooling the decamethylenebis {[2-(benzhydryloxy)ethyl]dimethylammonium bromide} separates as a dense precipitate and is collected by filtration, washed with ether and dried; M.P. 165–168° C. (dec.).

The following compounds can also be prepared by reaction, in the manner described, of 2-(benzhydryloxy)-N,N-dimethylethylamine with the corresponding reactive 1,10-decamethylene di-ester.

Decamethylenebis {[2-(benzhydryloxy)ethyl]dimethylammonium chloride}.

Decamethylenebis {[2-(benzhydryloxy)ethyl]dimethylammonium iodide}.

Decamethylenebis {[2-(benzhydryloxy)ethyl]dimethylammonium p-toluenesulfonate}.

Example 8

11.3 g. of 1.10-dibromodecane and 24.7 g. of 2-(p-brombenzhydryloxy)-N,N-dimethylethylamine in 50 ml. of acetonitrile are allowed to stand for 40 hours in a loosely stoppered flask at 60° C. The decamethylenebis {[2 - (p - brombenzhydryloxy)ethyl]dimethylammonium bromide} which separates is collected by filtration, washed with ether and dried; M.P. 157–159° C. (dec.).

Example 9

15 g. of 1,10-dibromodecane and 27 g. of 2-(p-methylbenzhydryloxy)-N,N-dimethylethylamine are dissolved in acetonitrile and allowed to stand in a loosely stoppered flask at 60° C. until a sample of the reaction mixture is soluble in water (ca. 30 hours). After cooling, the decamethylenebis {[2-(p - methylbenzhydryloxy)ethyl]dimethylammonium bromide} is collected, washed with ether and dried; M.P. 161–164° C. (dec.). The product can be recrystallized from isopropanol.

Example 10

9 g. of 1,10-dibromodecane and 16.8 g. of 2-(benzhydryloxy)ethylpiperidine are dissolved in 50 ml. of acetonitrile and allowed to stand in a stoppered flask for 30 days at room temperature. The decamethylenebis [-(2-(benzhydryloxy)ethylpiperidinium bromide] which separates is collected by filtration, washed with ether and dried; M.P. 196–199° C. (dec.). The product can be recrystallized from isopropanol.

The following compounds can also be prepared by the reaction, in the manner described, of 1,10-dibromodecane and the corresponding tertiary amine.

Decamethylenebis[2-(benzhydryloxyethyl)-4 - methylpiperidinium bromide].

Decamethylenebis [2-(benzhydryloxy)ethylpyrrolidinium bromide].

Example 11

7.5 g. of 1,10-dibromodecane and 14.8 g. of 5-(benzhydryloxy)-N,N-dimethylpentylamine are dissolved in acetonitrile and allowed to stand in a loosely stoppered flask for 60 hours at 50° C. After cooling, the decamethylenebis {[5 - (benzhydryloxy)pentyl]dimethylammonium bromide} which separates is collected by filtration, washed with ether and dried; M.P. 187–190° C. (dec.).

Example 12

5.6 g. of 2-(3,3-diphenylpropoxy)-N,N-dimethylethylamine, 3 g. of 1,10-dibromodecane in 10 ml. of acetonitrile are refluxed for 4½ hours. After cooling, the decamethylenebis {[2-(3,3 - diphenylpropoxy)ethyl]dimethylammonium bromide} which precipitates is collected by filtration, washed with ether and dried; M.P. 240–241° C. (dec.). The product can be recrystallized from methanol.

The 2-(3,3-diphenylpropoxy)-N,N-dimethylethylamine used as starting material can be prepared in the following manner: To 8.9 g. of dimethylaminoethanol in 50 ml. of dimethylformamide is added 2.5 g. of sodium hydride (5 g. of 50% sodium hydride in mineral oil) as rapidly as is consistent with good chemical practices. (The rapid evolution of hydrogen produces frothing.) To this mixture is added portionwise 27.5 g. of 3,3-diphenylpropyl bromide dissolved in approximately 50 ml. of dimethylformamide. The reaction mixture is allowed to stand overnight and then heated for one hour on a steam bath. The dimethyl formamide solvent is removed under reduced pressure while heating on a steam bath. The residue is suspended in water, acidified with hydrochloric acid and extracted with ether. The aqueous layer is made strongly alkaline with sodium hydroxide and the 2-(3,3-diphenylpropoxy)-N,N-dimethylethylamine is extracted from the aqueous alkaline solution with ether. The etheral solution is dried over magnesium sulfate and the ether evaporated in vacuo. The residue is purified by distillation at 132–135°/0.4 mm. to yield the pure product; M.P. 40–43° C.

Example 13

20 g. of 1,10-dibromodecane and 43 g. of 2-(benzhydryloxy)-N,N-diethylethylamine are refluxed in 70 ml. of acetonitrile until a sample of the reaction mixture is soluble in water. The hot solution is poured into a beaker and allowed to cool. The decamethylenebis {[2-(benzhydryloxy)ethyl]diethylammonium bromide} which separates on cooling is collected by filtration, washed with ether and dried; M.P. 170–173° C. (dec.):

The following compounds can also be prepared by reaction, in the manner described, of 2-(benzhydryloxy)-N,N-diethylethylamine with the corresponding alkylene di-ester.

Nonamethylenebis {[2-(benzhydryloxy)ethyl]diethylammonium chloride}.

Tetradecamethylenebis {[2-(benzhydryloxy)ethyl]diethylammonium bromide}.

Hexadecamethylenebis {[2-(benzhydryloxy)ethyl]diethylammonium iodide}.

Example 14

4.8 g. of 1,10-dibromodecane and 11.2 g. of 2-(p-brombenzhydrylthio)-N,N-dimethylethylamine are dissolved in acetonitrile. The reaction mixture is then allowed to stand for 30 hours in a loosely stoppered flask at 50° C. The decamethylenebis {[2-(p-bromobenzhydrylthio)ethyl]dimethylammonium bromide}, hemihydrate which separates is collected by filtration, washed with ether and dried; M.P. 164–167° C. (dec.). The product can be recrystallized from ethanol.

Example 15

7.5 g. of 1,10-dibromodecane and 12 g. of 3,3-diphenyl-N,N-dimethylpropylamine are dissolved in acetonitrile and allowed to stand for 60 hours in a loosely stoppered flask at 50° C. After cooling, the decamethylenebis-[3,3 - (diphenylpropyl) - dimethylammonium bromide] which separates is collected by filtration, washed with ether and dried; M.P. 237–239° C. (dec.). The product can be recrystallized out of ethanol.

Example 16

9.4 g. of 1,11-dibromoundecane and 15.4 g. of 2-(benzhydryloxy) - N,N - dimethylethylamine are dissolved in 50 ml. of acetonitrile and allowed to stand in a loosely stoppered flask for 60 hours at 50° C. After cooling, the undecamethylenebis {[2-(benzhydryloxy)ethyl]dimethylammonium bromide} which separates is collected by filtration, washed with ether and dried; M.P. 152–154° C. (dec.). The product can be recrystallized from acetonitrile.

Example 17

11.5 g. of 1,12-dibromododecane and 16.5 g. of 2-(benzhydryloxy)-N,N-dimethylethylamine are dissolved in 50 ml. of acetonitrile and allowed to stand for 60 hours at 60° C. in a flask loosely stoppered with aluminum foil. After cooling, the dodecamethylenebis{[2-(benzhydryloxy)ethyl]-dimethylammonium bromide} which separates is collected by filtration, washed with ether and dried; M.P. 166–168° C. (dec.). The product can be recrystallized from isopropanol.

Example 18

7.1 g. of 1,14-dibromotetradecane and 10 g. of 2-(benzhydryloxy)-N,N-dimethylethylamine are dissolved in 50 ml. of acetonitrile and allowed to stand in a loosely stoppered flask for 3 days at 50° C. After cooling, the tetradecamethylenebis {[2 - (benzhydryloxy)ethyl]dimethylammonium bromide} which separates is collected by filtration, washed with ether and dried; M.P. 175–178° C. (dec.). The product can be recrystallized from isopropanol.

Example 19

9.6 g. of 1,16-diiodohexadecane and 9.5 g. of 2-(benzhydryloxy)-N,N-dimethylethylamine are refluxed in acetonitrile until a sample of the reaction mixture is substantially soluble in water (ca. 3 days). The solvent is then removed in vacuo. Trituration of the residue with several portions of acetone results in the separation of hexadecamethylenebis {[2-(benzhydryloxy)ethyl]dimethylammonium iodide}; M.P. 113–116° C. (dec.).

The following compounds can also be prepared by the reaction, in the manner described, of the 1,16-diiodohexadecane and the corresponding tertiary amine.

Hexadecamethylenebis {[2 - (benzhydrylthio)ethyl]dimethylammonium iodide}.

Hexadecamethylenebis {[2 - (p - chlorbenzhydryloxy)ethyl]dimethylammonium iodide}.

Example 20

39 g. bis (4-bromotetramethylene)ether and 55.5 g. of 2-(benzhydryloxy)-N,N-dimethylethylamine are refluxed in 75 ml. of acetonitrile until a sample of the reaction mixture is completely soluble in water (overnight). Upon cooling the [oxybis(tetramethylene)]bis {[2-(benzhydryloxy)ethyl]-dimethylammonium bromide} which separates is collected by filtration, washed with ether and dried.

The following compounds can also be prepared by the reaction, in the manner described, of 2-(benzhydryloxy)-N,N-dimethylethylamine with the corresponding α,ω-di-halo-hetero-alkylene compound.

[Oxybis(tetramethylene)]bis {[2-(benzhydryloxy)ethyl]dimethylammonium chloride}, dihydrate.

[Oxybis(heptamethylene)]bis {[2-(benzhydryloxy)ethyl]dimethylammonium bromide}.

[Oxybis(pentamethylene)]bis {[2 - (benzhydryloxy)ethyl]dimethylammonium bromide}.

[Oxybis(nonamethylene)]bis {[2 - benzhydryloxy)ethyl]dimethylammonium bromide}.

[Oxybis(ethylenethioethylene)]bis {[2 - (benzhydryloxy)ethyl]dimethylammonium chloride}.

[Oxybis(ethyleneoxyethylene)]bis {[2 - (benzhydryloxy)ethyl]dimethylammonium chloride}.

*Example 21*

4.0 g. of 1,10-bis(dimethylaminopentoxy)decane and 6.0 g. of 3,3-diphenylpropyl bromide are dissolved in 30 ml. of acetonitrile and the reaction mixture refluxed for 3 days. The solvent is then removed by distillation in vacuo, the final traces under high vacuum. The resulting residue is dissolved in acetone and ether added. The [decamethylenebis(oxypentamethylene)]bis[3,3 - diphenylpropyl) didimethylammonium bromide] which precipitates is separated from the solvent by decantation, redissolved in acetone and reprecipitated by addition of ether. The white amorphous solid is dried over $P_2O_5$ in a vacuum dessicator.

The following compounds can also be prepared by the reaction, in the manner described, of a 3,3-diphenylpropyl halide with the corresponding heterodiamine.

[Decamethylenebis(oxyethylene)]bis[(3,,3 - diphenylpropyl)dimethylammonium bromide].

[Hexadecamethylenebis(oxypentamethylene)] - bis[3,3-diphenylpropyl)dimethylammonium bromide].

The 1,10-bis(dimethylaminopentoxy)decane employed as starting material can be prepared in the following manner: To a stirred solution of 95 g. of freshly distilled 5-(N,N-dimethylamino)amylalcohol in 700 g. of toluene at 70–80° C. is added portionwise 36 g. of 50% NaH (in mineral oil). Nitrogen gas is passed through the system during the addition of the NaH. The reaction mixture is stirred an additional hour and 75 g. of 1,10-dibromodecane added portionwise. During the addition of the dibromide the temperature of the reaction mixture is raised to 100° C. After the addition of the dibromide is complete the reaction mixture is heated at reflux temperature for five hours and allowed to stand overnight. The toluene is then removed by distillation and 65 ml. of concentrated hydrochloric acid in 300 ml. of water added to the residue. The acidic mixture is extracted with ethyl ether, the ethereal solution discarded, the acidic aqueous layer adjusted to a pH of 8 to 10 with 10 N sodium hydroxide and extracted with several portions of ether. The ether portions are combined and the solvent removed by distillation in vacuo. The 1,10-bis(dimethylaminopentoxy)decane is recovered from the residue by distillation in vacuo; B.P. 170–177° C. at 1/mm.

*Example 22*

8.0 g. of 1,10-bis(dimethylaminoethoxy)decane and 15.0 g. of 2-(benzhydryloxy)ethyl bromide are refluxed in 50 ml. of acetonitrile for 24 hours. The solvent is then removed by distillation in vacuo and the residue dissolved in acetone. The acetone solution is cooled by means of a Dry Ice-methanol bath and ether added slowly. The solvent is removed from the oil which separates and the oil redissolved in acetone and reprecipitated by the addition of ethyl ether. The [decamethylenebis(oxyethylene)]-bis {[2-(benzhydryloxy)ethyl]dimethylammonium bromide} which separates is dried in a vacuum dessicator over $P_2O_5$.

The 1,10-bis(dimethylaminoethoxy)decane employed as starting material can be prepared in the manner described in Example 21 by substituting 65 g. of freshly distilled dimethylamino ethanol for the 95 g. of the 5-(N,N-dimethylamino)amylalcohol.

*Example 23*

3.44 g. of N,N,N',N'-tetramethylhexamethylenediamine and 11.8 g. of 2-(benzhydryloxy)ethyl bromide are dissolved in 15 ml. of acetonitrile. The reaction mixture is then allowed to stand for 20 days in a loosely stoppered flask at 50° C. The hexamethylenebis{[2-(benzyhydryloxy)ethyl]dimethylammonium bromide} which separates is collected by filtration, washed with ether and dried; M.P. 220–221° C. (dec.). The product can be recrystallized from isopropanol and methanol.

*Example 24*

3.72 g. of N,N,N',N'-tetramethylheptamethylenediamine and 11.8 g. of 2-(benzhydryloxy)ethyl bromide dissolved in 15 ml. of acetonitrile and allowed to stand for 20 days in a loosely stoppered flask at 50° C. After cooling, the heptamethylenebis{[2 - (benzhydryloxy)ethyl]dimethylammonium bromide} which separates is collected by filtration, washed with ether and dried; M.P. 185–188° C. (dec.).

*Example 25*

4.56 g. of N,N,N',N'-tetramethyldecamethylene-diamine and 11.8 g. of 2-(benzhydryloxy)ethyl bromide in 25 ml. of acetonitrile are allowed to react for 20 days in a loosely stoppered flask at 50° C. After cooling, the decamethylenebis{[2-(benzhydryloxy)ethyl]dimethylammonium bromide} which separates is collected by filtration, washed with ether and dried; M.P. 165–168° C. (dec.).

*Example 26*

14.1 g. of methyl iodide and 12.4 g. of 1,10-decamethylenebis [2-(benzhydryloxy)ethylmethylamine] are dissolved in 15 ml. of acetonitrile. The reaction mixture is then allowed to stand for 72 hours at 40° C. in a flask loosely stoppered with aluminum foil. After cooling, the decamethylenebis{[2-(benzhydryloxy)-ethyl]dimethylammonium iodide} which separates is collected by filtration, washed with ether and dried.

Similarly, 15.0 g. of p-toluenesulfonate methyl ester may be substituted for the 14.1 g. of methyl iodide to yield decamethylenebis{[2-(benzhydryloxy)ethyl]dimethylammonium p-toluenesulfonate}.

By substituting 13 g. of 1,10-decamethylenebis[2-(benzhydryloxy)ethylethylamine] for the 12.4 g. of 1,10-decamethylenebis [2-(benzhydryloxy)ethylmethylamine] in the above procedure, the corresponding decamethylenebis {[2-(benzhydryloxy) - ethyl]ethylmethylammonium iodide} is produced.

*Example 27*

A dilute solution of 4.5 g. of the sodium salt of pamoic acid (2,2'-dihydroxy-1,1'-dinaphthyl-methane-3,3'-dicarboxylic acid) is added to 8.1 g. of decamethylenebis[2-(benzhydryloxy)ethyl]dimethylammonium bromide is dissolved in a large volume of distilled water. An oily precipitate forms which slowly crystallizes. The decamethylenebis{[2-(benzhydryloxy)ethyl]dimethylammonium pamoate} is collected by filtration, dissolved in isopropanol, and isopropanolic solution filtered and the product precipitated by adding acetone. The yellowish salt is collected by filtration and dried overnight at 50° C.; M.P. 221–224° C. (dec.).

*Example 28*

12 g. of sodium p-toluenesulfonate is dissolved in 100 ml. of distilled water and added to a solution of 16.2 g. of decamethylenebis{[2-(benzhydryloxy]dimethylammonium bromide} dissolved in 2 liters of distilled water. The precipitated syrup slowly crystallizes and the decamethylenebis{[2 - (benzyhydryloxy)ethyl]dimethylammonium p-toluenesulfonate} is collected by filtration, washed with 200 ml. of distilled water and dried. The product is recrystallized successively from acetone and water; M.P. 168–170° C. (dec.) (hydrate form).

*Example 29*

A methanolic solution containing approximately 0.04 g. of decamethylenebis{[2-(benzhydryloxy)ethyl]dimethylammonium hydroxide} per ml. is neutralized with methanolic hydrogen chloride employing phenolnaphthalein as indicator. The methanolic solution is then evaporated to dryness and the residue extracted with acetone and the crystalline decamethylenebis{[2-(benzhydryloxy)ethyl]-dimethylammonium chloride} recrystallized from nitromethane; M.P. 195–197° C. (dec.).

In like manner, salts of the decamethylenebis{[2-(benzhydryloxy)ethyl]dimethylammonium} cation with other acids can be prepared. The following salts can be prepared from the above hydroxide form and two or more equivalents of the corresponding acid.

Decamethylenebis{[2 - (benzhydryloxy)ethyl]dimethylammonium iodide}.

Decamethylenebis{[2 - (benzhydryloxy)ethyl]dimethylammonium sulfate}.

Decamethylenebis{[2 - (benzhydryloxy)ethyl]dimethylammonium p-toluenesulfonate}.

Decamethylenebis{[2 - (benzhydryloxy)ethyl]dimethylammonium benzoate}.

The methanolic solution of decamethylenebis{[2-(benzhydryloxy)ethyl]dimethylammonium hydroxide} employed as starting material can be prepared in the following manner: A column of two inch diameter is prepared from 1600 ml. of an anion exchange resin such as IRA–410 resin. The column is then washed successively with water and methanol. 40.5 g. of decamethylenebis{[2 - (benzhydryloxy)ethyl]dimethylammonium bromide} is dissolved in 405 ml. of methanol and allowed to flow slowly through the column. The column is then washed with 400 ml. of methanol to yield a combined volume of 800 ml. of a methanolic solution of decamethylenebis{[2 - (benzhydryloxy)ethyl]dimethylammonium hydroxide} containing approximately 0.04 g. of the basic salt per ml. of solution.

What is claimed is:

1. A bis quaternary compound of the formula

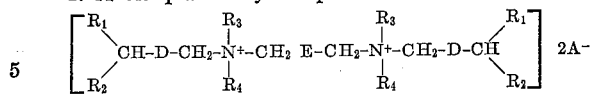

wherein $R_1$ represents a phenyl radical and $R_2$ represents a member of the group consisting of unsubstituted phenyl and phenyl substituted by a member selected from the group consisting of chloro, bromo and lower alkyl; $R_3$ and $R_4$ each represent a member of the group consisting of lower alkyl radicals containing one to two carbon atoms and further members wherein $R_3$ and $R_4$ together form an alkylene radical containing four to five carbon atoms inclusive; D represents a member of the group consisting of alkylene radicals and alkylene radicals in which a member selected from the group consisting of —O— and —S— is substituted for at least one but not more than two-thirds of the non-adjacent methylene groups, said D group containing between one and eight atoms inclusive in its principal chain; E represents a member of the group consisting of alkylene radicals and alkylene radicals in which a member selected from the group consisting of —O— and —S— is substituted for some, but not more than two-thirds, of the non-adjacent methylene groups, said E group containing between four and thirty atoms inclusive in its principal chain; and $A^-$ is one equivalent of an anion of an acid selected from the class consisting of inorganic acids, organic carboxylic acids, and organic sulfonic acids.

2. A bis quaternary compound of the formula

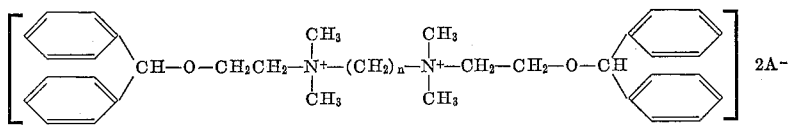

wherein $A^-$ represents one equivalent of an anion of an acid selected from the class consisting of hydrobromic, hydriodic, hydrochloric, sulfuric, benzoic, pamoic and p-toluene-sulfonic acids, and n is an integer between 6 and 14 inclusive.

3. A bis quaternary compound of the formula

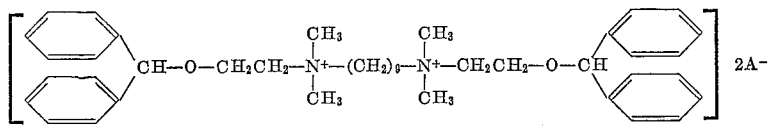

wherein $A^-$ is one equivalent of an anion of an acid selected from the class consisting of hydrobromic, hydriodic, hydrochloric, sulfuric, benzoic, pamoic and p-toluene-sulfonic acids.

4. A bis quaternary compound of the formula

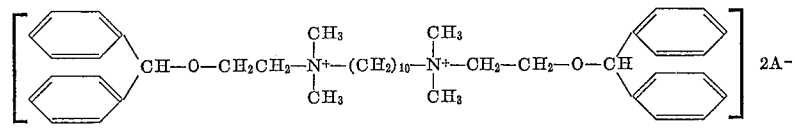

wherein $A^-$ is an equivalent of an anion of an acid selected from the class consisting of hydrobromic, hydriodic, hydrochloric, sulfuric, benzoic, pamoic and p-toluene-sulfonic acids.

5. A bis quaternary compound of the formula

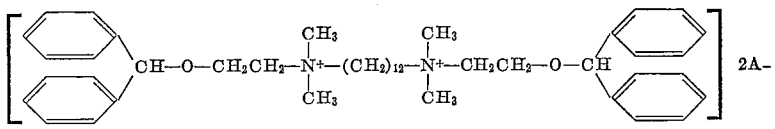

wherein A⁻ is one equivalent of an anion of an acid selected from the class consisting of hydrobromic, hydriodic, hydrochloric, sulfuric, benzoic, pamoic and p-toluene-sulfonic acids.

6. A bis quaternary compound of the formula

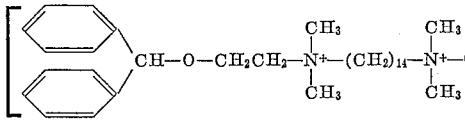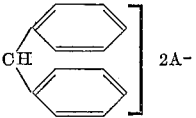

wherein A⁻ is one equivalent of an anion of an acid selected from the class consisting of hydrobromic, hydriodic, hydrochloric, sulfuric, benzoic, pamoic and p-toluene-sulfonic acids.

7. A bis quaternary compound of the formula

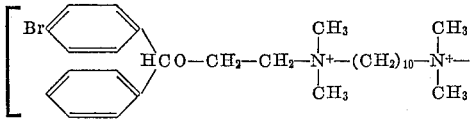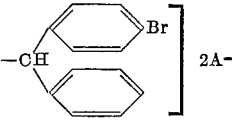

wherein A⁻ is one equivalent of an anion of an acid selected from the class consisting of hydrobromic, hydriodic, hydrochloric, sulfuric, benzoic, pamoic and p-toluene-sulfonic acids.

8. Decamethylenebis {[2 - (benzhydryloxy) - ethyl]dimethylammonium bromide}.

9. Decamethylenebis {[2 - (benzhydryloxy - ethyl]dimethylammonium chloride}.

10. Nonamethylenebis {[2 - (benzhydryloxy) - ethyl]-dimethylammonium bromide}.

11. Decamethylenebis {[2 - (p - bromobenzhydryloxy) ethyl]dimethylammonium bromide}.

12. Tetradecamethylenebis {[2 - (benzhydryloxy)-ethyl]dimethylammonium bromide}.

References Cited in the file of this patent

UNITED STATES PATENTS

| | | |
|---|---|---|
| 2,499,417 | Rieveschl | Mar. 7, 1950 |
| 2,532,292 | Cusic | Dec. 5, 1950 |
| 2,743,294 | Fakstorp | Apr. 24, 1956 |
| 2,772,310 | Morris | Nov. 27, 1956 |
| 2,783,237 | Cavallito et al. | Feb. 26, 1957 |
| 2,835,676 | Sprague | May 20, 1958 |
| 2,913,459 | Suter | Nov. 17, 1959 |
| 2,949,485 | Oroshnik et al. | Aug. 16, 1960 |